US009088440B2

(12) United States Patent
Cai et al.

(10) Patent No.: US 9,088,440 B2
(45) Date of Patent: Jul. 21, 2015

(54) TELECOM INFORMATION FOR WEB SERVICES THAT ARE PROVIDED BY A TELECOM NETWORK

(75) Inventors: Yigang Cai, Naperville, IL (US); Suzann Hua, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 262 days.

(21) Appl. No.: 13/476,723

(22) Filed: May 21, 2012

(65) Prior Publication Data
US 2013/0308629 A1 Nov. 21, 2013

(51) Int. Cl.
*H04L 12/64* (2006.01)

(52) U.S. Cl.
CPC .................. *H04L 12/6418* (2013.01)

(58) Field of Classification Search
CPC .................. H04L 29/06027; H04L 29/06047; H04L 29/0809; H04L 12/6418; H04W 4/02; H04W 4/00; H04W 8/18
USPC .......... 370/241, 252, 351, 352, 389, 400, 401, 370/428; 455/403, 414.1, 414.2, 414.3, 455/422.1, 432.1, 432.3; 709/201, 203, 709/227, 228
See application file for complete search history.

(56) References Cited

U.S. PATENT DOCUMENTS

| | | | |
|---|---|---|---|
| 2002/0029260 A1* | 3/2002 | Dobbins et al. | 709/219 |
| 2003/0061404 A1* | 3/2003 | Atwal et al. | 709/328 |
| 2005/0037751 A1* | 2/2005 | Kim et al. | 455/432.1 |
| 2005/0086330 A1* | 4/2005 | Perham et al. | 709/220 |
| 2010/0211631 A1* | 8/2010 | Lee et al. | 709/203 |
| 2010/0312863 A1* | 12/2010 | Mohr | 709/220 |
| 2011/0053590 A1* | 3/2011 | Belling et al. | 455/435.1 |
| 2011/0202647 A1* | 8/2011 | Jin et al. | 709/223 |

OTHER PUBLICATIONS

Song, et al., IETF Internet Draft: draft-song-server-discovery-02.txt, "ALTO Service Discovery", Jun. 26, 2010.
M. Stiemerling, ETF Internet Draft: draft-ietf-alto-deployments-01.txt, "ALTO Deployment Consideration", Mar. 14, 2011.
Alimi, et al., IETF Internet Draft: draft-ietf-alto-protocol-08.txt, "ALTO Deployment Consideration", May 20, 2011.
3rd Generation Partnership Project; Technical Specification Group Services and System Aspects; Policy and charging control architecture (Release 7) 3GPP TS 23.203 V7.3.0 (Jun. 2007) 650 Route des Lucioles—Sophia Antipolis Valbonne—France.

* cited by examiner

*Primary Examiner* — Obaidul Huq
(74) *Attorney, Agent, or Firm* — Duft Bornsen & Fettig, LLP

(57) ABSTRACT

Systems and methods for identifying telecom information for web services that will be provided by a telecom network. In one embodiment, a telecom data element is implemented in a telecom network. When a web service request is initiated by an application and sent to a web service gateway, the web service gateway sends a query to the telecom data element. The telecom data element receives the query, and identifies telecom information that relates to the web service that will be provided by the telecom network. For example, the telecom information may comprise policy rules, context information (e.g., location, presence, etc.), and subscriber profiles. After collecting the telecom information, the telecom data element transmits a response to the web service gateway that includes the telecom information. The web service gateway may then process the telecom information to determine how to handle the service request for the web service.

20 Claims, 5 Drawing Sheets

TELECOM INFORMATION FOR WEB SERVICES THAT ARE PROVIDED BY A TELECOM NETWORK

FIELD OF THE INVENTION

The invention is related to the field of communications and, in particular, to web services that are provided by a telecom network.

BACKGROUND

Web services are becoming very popular as more and more web sites and applications are available to consumers. Some examples of web services are Facebook, Google Voice, Twitter, etc. Web services may be browser-based services or non-browser-based. With a browser-based service, an end user device (e.g., a smart phone) has a browser that accesses a web application over a network, such as the internet, an enterprise intranet, etc. The web application is coded in a language supported by the browser, such as JavaScript, HTML, etc. The browser then renders the web application executable to access/provide the desired service. With non-browser-based services, the web application (i.e., the executable) is downloaded and stored on the end user device. The end user device is able to execute the application without using a browser to access/provide the desired service. The application downloaded onto an end user device is commonly referred to as a "mobile app" or a "phone app".

When an end user requests a web service, the end user device generates a service request and sends the service request to a server that is able to provide the requested web service. The service request is typically sent using an open Application Programming Interface (API) that is defined for web-based services. For example, the open API may be Simple Object Access Protocol (SOAP), RESTful, ParlayX, etc. The server or an intermediate gateway then converts the open API request to a request in the protocol supported by the server. The server then provides the requested web service to the requesting device.

Because of the popularity of web services, service providers are continually looking for ways to improve the quality of the web services from the point of view of the consumer and the service provider.

SUMMARY

Embodiments described herein provide enhanced policy control for web services when the web service is provided by a telecommunication (telecom) network. When a web service involves communication over a telecom network, the embodiments described herein collect telecom information applicable to the web service and handle the web service based on the telecom information. For example, a web service may request a voice call to a party. If the voice call will be communicated over a telecom network, then policy rules defined in the telecom network may be collected and used to determine how to handle a web service in addition to the general web service policy control. Previously, when a gateway received an open API request for a web service that involved a telecom network, the gateway would convert the open API request to a request in the protocol understood by an element of the telecom network, and send the converted request to the telecom network to provide the service. But, the gateway was not able to access information in the telecom network that may be useful in handling the service request. For example, if the service request was for a voice call from one party to another party, the gateway was not able to access a subscriber profile for either party, provide context information for either party, acquire policy rules, etc. In the embodiments provided herein, a telecom data element is installed in the telecom network and is able to identify telecom information applicable to web services that are provided by the telecom network. For example, the telecom data element may identify policy rules in the telecom network that are applicable to a requested web service, may determine context information in the telecom network for a requested web service, may determine a subscriber profile in the telecom network for a party involved in the requested web service, etc. The telecom data element may then provide the telecom information to the gateway which received the service request. The gateway may better determine how to handle the service request based on the telecom information received from the telecom network. For example, the gateway may decide whether or not to forward the service request to the telecom network based on the telecom information. Because the gateway can handle the service request more effectively based on the telecom information, service providers are able to provide higher quality services to their customers.

One embodiment comprises a web service gateway that is configured to receive a service request for a web service from a web-based application. The web service gateway is further configured to determine that at least a portion of the web service will be provided by a telecom network. In other words, the web service gateway determines that the web service involves a communication over a telecom network, and that one or more network elements in the telecom network will contribute to providing the requested web service. The web service gateway is further configured to transmit a query to the telecom network requesting information that relates to the web service.

Another embodiment comprises a telecom data element of a telecom network. The telecom data element is configured to receive the query from the web service gateway regarding the web service. The telecom data element is further configured to identify telecom information that relates to the web service that will be provided by the telecom network. For example, the telecom information may comprise policy rules, context information (e.g., location, presence, etc.), and subscriber profiles. After collecting the telecom information, the telecom data element is further configured to transmit a response to the web service gateway that includes the telecom information.

In another embodiment, the web service gateway is further configured to receive the response from the telecom data element that includes the telecom information, and to process the telecom information to determine how to handle the service request for the web service. The web service gateway is further configured to convert the service request from a first protocol to a second protocol used in the telecom network, and to select a subset of the telecom information to insert in the converted service request. The web service gateway is further configured to transmit the converted service request to a network element of the telecom network that provides the web service.

In another embodiment, the interface between the telecom data element and the web service gateway comprises an open Application Programming Interface (API).

In another embodiment, the interface between the telecom data element and the web service gateway comprises a Diameter interface.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
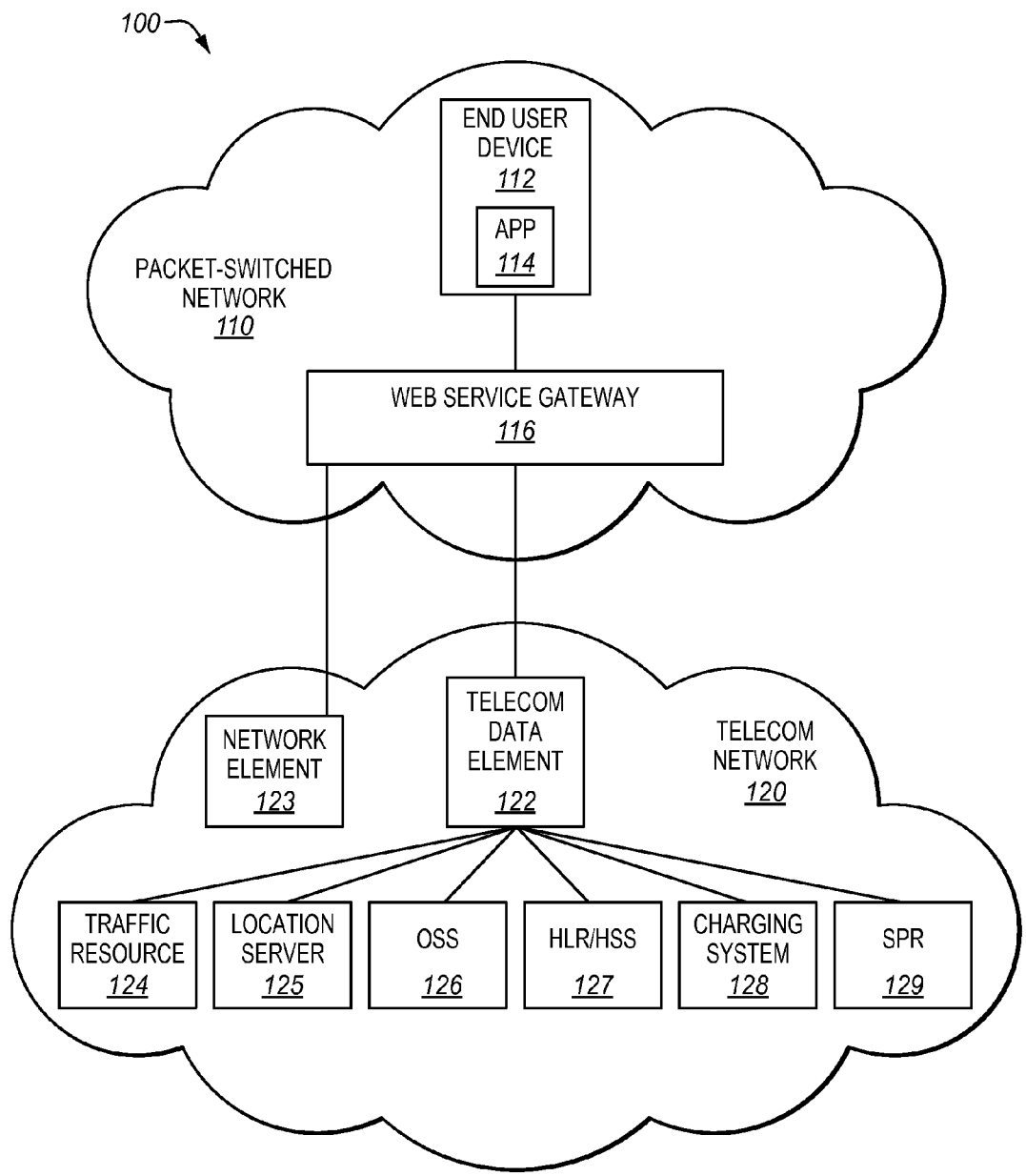
FIG. 1 illustrates a communication system in an exemplary embodiment.

FIG. 1 illustrates a communication system 100 in an exemplary embodiment. Communication system 100 includes a packet-switched network 110 and a telecom (telecommunication) network 120. Packet-switched network 110 comprises any network that provides data services through gateways and/or routers using a protocol such as IP. Packet-switched network 110 may comprise the internet, an enterprise network, the World Wide Web, etc. Telecom network 120 comprises any network that enables telecommunication between terminal devices. Some examples of telephony services offered by telecom network 120 include voice calls, text messaging, multimedia messaging, voicemail, etc. Some examples of telecom network 120 are an IP Multimedia Subsystem (IMS) network, a Long Term Evolution (LTE) network, etc.

Packet-switched network 110 offers web services (or web-based services) to its end users. FIG. 1 illustrates an end user device 112 that accesses web services offered by packet-switched network 110. Examples of web services are Facebook, Twitter, Google Voice, enterprise services, etc. Device 112 executes an application 114 that is able to initiate a desired web service. Packet-switched network 110 also includes a web service gateway 116. Web service gateway 116 comprises any system, server, or device that interfaces a web-based application with other network elements. Web service gateway 116 is able to receive service requests from the web-based application that are formatted according to an open API, such as RESTful, SOAP, Parlay X, etc. Web service gateway 116 is able to convert the service requests into protocols that are used by network elements that provide services. For example, web service gateway 116 may convert a RESTful service request into Session Initiation Protocol (SIP) request for a service provided by an IMS network.

Telecom network 120 includes a telecom data element 122. Telecom data element 122 comprises any system, server, or device that is able to identify telecom information that relates to a web service provided by telecom network 120. The telecom information may comprise policy rules, charging rules, context information, subscriber profiles, etc. Telecom network 120 further includes a network element 123. Network element 123 comprises any system, server, or switch that provides a function or functions for a web service. For example, if the web service requests a voice call, then network element 123 may comprise a switch or Call Session Control Function (CSCF) that manages the voice call over telecom network 120. Those skilled in the art will appreciate that multiple elements of telecom network 120 may commit resources to provide a function for a web service.

Assume for this embodiment that an end user of device 112 selects application (app) 114, and initiates a web service through application 114. When this occurs, application 114 generates a service request for the web service according to the open API. Application 114 then sends the service request to web service gateway 116, which may then operate as described in FIG. 2.

Figure 2:
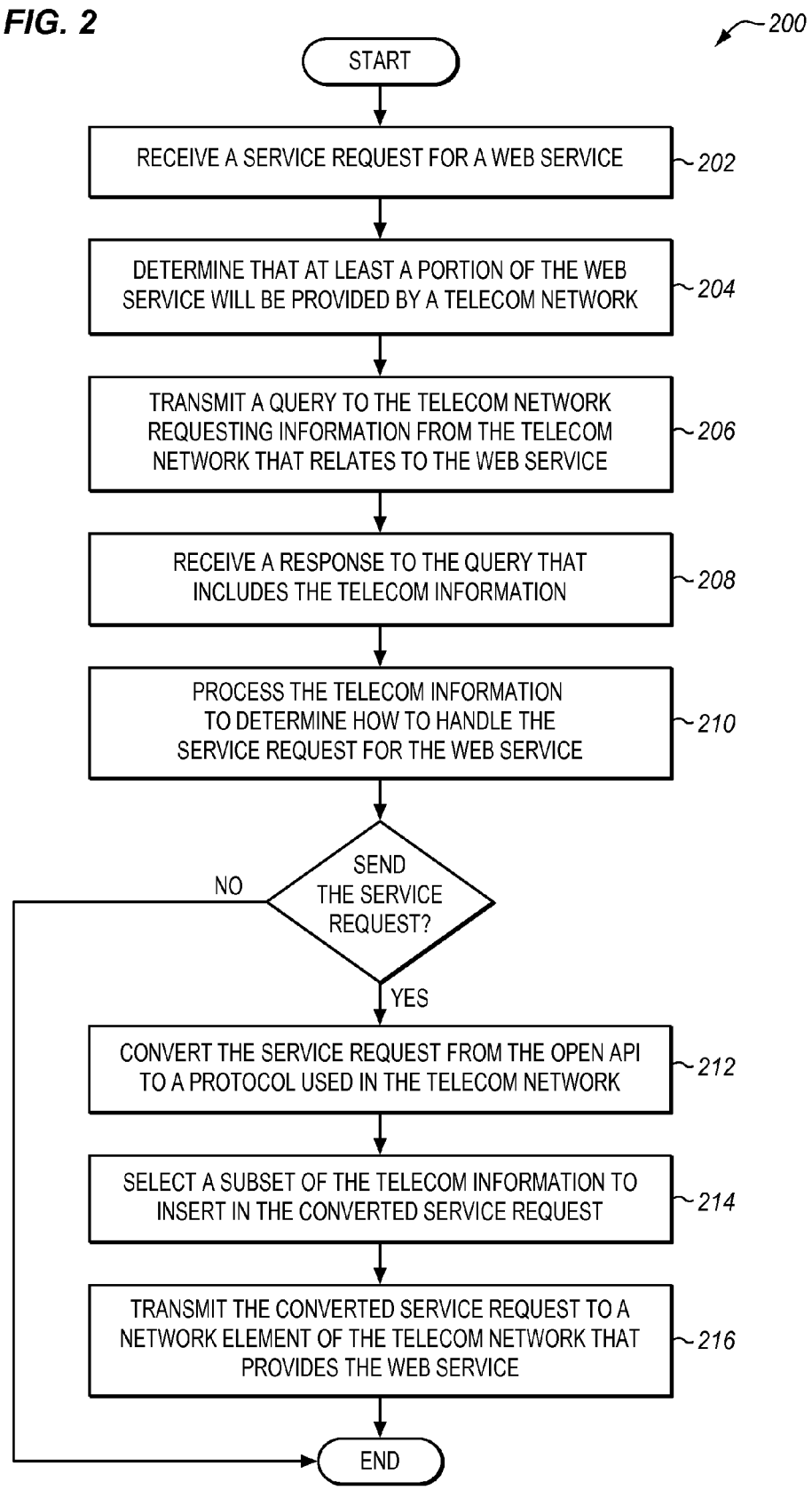
FIG. 2 is a flow chart illustrating a method of handling a service request for a web service in an exemplary embodiment.

FIG. 2 is a flow chart illustrating a method 200 of handling a service request for a web service in an exemplary embodiment. The steps of method 200 will be described with reference to web service gateway 116 in FIG. 1, but those skilled in the art will appreciate that methods described herein may be performed in other systems. The steps of the flow charts described herein are not all inclusive and may include other steps not shown. The steps may also be performed in an alternative order.

In step 202, web service gateway 116 receives the service request for the web service. In step 204, web service gateway 116 determines that at least a portion of the web service will be provided by telecom network 120. To do so, web service gateway 116 may process one or more headers of the service request to identify the type of service initiated, and to determine that the service type involves communications over telecom network 120 (at least partially). For example, web service gateway 116 may determine that the requested web service is for a voice call, such as Google Voice. Google Voice allows an end user to place voice calls or send text messages through a web portal. Thus, some or all of this type of web service will be provided by a network element belonging to telecom network 120.

When part or all of a requested web service will be provided by telecom network 120, web service gateway 116 transmits a query to telecom network 120 requesting information that relates to the web service in step 206. The information that relates to the web service may vary based on desired implementations. Web service gateway 116 may send the query to telecom network 120 using an open API, Diameter protocol, or some other protocol.

Figure 3:
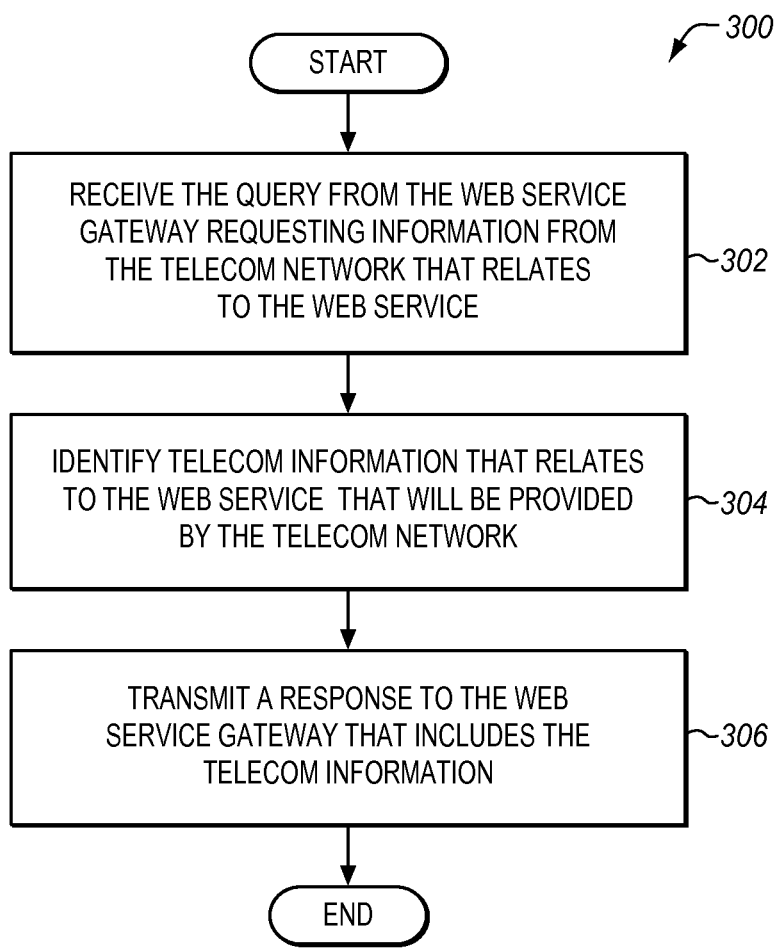
FIG. 3 is a flow chart illustrating a method of providing telecom information for a web service in an exemplary embodiment.

FIG. 3 is a flow chart illustrating a method 300 of providing telecom information for a web service in an exemplary embodiment. The steps of method 300 will be described with reference to telecom data element 122 in FIG. 1, but those skilled in the art will appreciate that methods described herein may be performed in other systems.

In step 302, telecom data element 122 receives the query from web service gateway 116. The query from web service gateway 116 may include information applicable to the web service. For instance, the query may include an identifier for one or more parties involved in the web service, such as a directory number, a Public User ID (PUID), an email address, etc. The query may also include a service type or media type, such as voice call, SMS, MMS, etc. In step 304, telecom data element 122 identifies telecom information that relates to the web service that will be provided by telecom network 120. For example, telecom data element 122 may identify policy rules (e.g., Policy and Charging Control (PCC) rules) applicable to the portion of the web service that will be provided by telecom network 120. Telecom data element 122 may identify context information applicable to the portion of the web service that will be provided by telecom network 120, such as a location of a party, a presence of a party, etc. Telecom data element 120 may identify a subscriber profile for one or more parties involved in the web service. Telecom data element 120 may gather any other information that is relevant to features or functions that may be provided by telecom network 120 as part of implementing the requested web service.

In order to identify the telecom information, telecom data element 122 may query other entities of telecom network 120. FIG. 1 shows examples of entities that may exist in telecom network 120. For instance, telecom network 120 may include a traffic resource server 124, a location server 125, an Operations Support System (OSS) 126, a Home Location Register (HLR) or Home Subscriber Server (HSS) 127, a charging system 128 (e.g., either Online Charging System (OCS) or Offline Charging system (OFCS)), and a Subscriber Profile Repository (SPR) 129. Telecom data element 122 may contact any of these or other entities in order to acquire telecom information that is related to the requested web service. After collecting the telecom information, telecom data element 122 transmits a response to web service gateway 116 that includes the telecom information in step 306.

In FIG. 2, web service gateway 116 receives the response from telecom data element 122 that includes the telecom information in step 208. Web service gateway 116 then processes the telecom information to determine how to handle the service request for the web service in step 210. For example, web service gateway 116 may process internal rules from a policy engine using the telecom information, and generate finalized policy rules for the requested web service. Web service gateway 116 will then handle the service request based on the finalized policy rules. As one example, assume that the telecom information includes a policy rule or subscriber profile that indicates a time period when voice calls intended for a party are restricted (such as from 10:00 P.M. to 8:00 A.M.). Web service gateway 116 processes the policy rules from telecom network 120 and internal rules to generate finalized policy rules, where the finalized policy rules state that voice calls intended for a party are restricted during a time period. If the present web service includes a voice call to the party during the restricted time period, then web service gateway 116 will not allow the web service.

As another example, assume that the telecom information includes a policy rule or subscriber profile which indicates that a party wishes to receive a message as an email message during work hours, and as an SMS message after work hours. Web service gateway 116 processes the policy rules from telecom network 120 and internal rules to generate finalized policy rules, where the finalized policy rules state that a party will receive an incoming message as an email during a first time period (i.e., during work hours) and will receive the incoming message as an SMS message during a second time period (i.e., after work hours). If the present web service includes a message to the party, then web service gateway 116 decides whether to send the message to the party as either an email or an SMS message depending on the time of day.

As part of handling the service request, web service gateway 116 may determine whether or not to send the service request to telecom network 120 based on the finalized policy rules. If the determination is not to send the service request, then method 200 ends. Web service gateway 116 may send a notification to application 114 (see FIG. 1) indicating that the web service was not allowed and possibly indicating the reasons why the web service was not allowed.

If the determination is to send the service request, then web service gateway 116 converts the service request from the open API to a protocol used in telecom network 120 in step 212. After conversion, web service gateway 116 select a subset (i.e., zero, some, or all) of the telecom information to provide to telecom network 120, and inserts the selected telecom information in the service request in step 214. Web service gateway 116 then transmits the service request to network element 123 of telecom network 120 that provides the web service. Network element 123 may include a "network service enabler" that provides the web service.

The embodiment described above provides enhanced web services when telecom network 120 is involved. Before web service gateway 116 forwards a service request to telecom network 120 to provide a web service, telecom data element 122 is able to collect telecom information that relates to the web service. Web service gateway 116 then processes the telecom information to determine how to handle the service request. Previously, a gateway did not consult with a telecom network even though a web service requested communications over the telecom network. When a web service requests communications over telecom network 120 in the above embodiment, web service gateway 116 contacts telecom data element 122 in advance to retrieve information from telecom network 120 that is related to the web service. By collecting the telecom information in advance, web service gateway 116 is able to more effectively determine how to handle the request for the web service.

EXAMPLE

Figure 4:
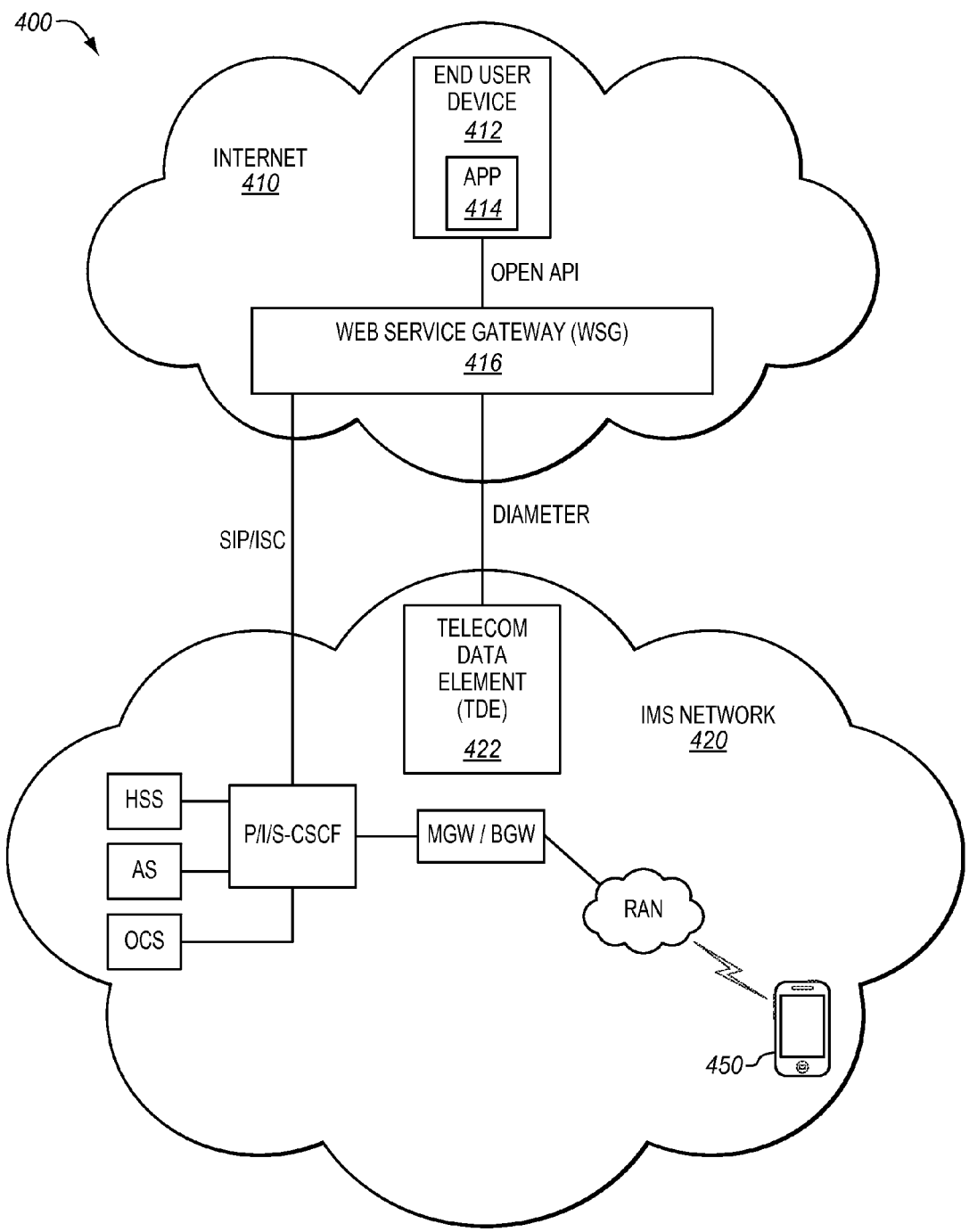
FIG. 4 illustrates a communication system in another exemplary embodiment.

FIG. 4 illustrates a communication system 400 in another exemplary embodiment. Communication system 400 includes the internet 410 and an IMS network 420. In this example, internet 410 provides a variety of web services. One particular web service that is offered is a "Click-to-Dial" service. In a "Click-to-Dial" service, an end user can click on an icon, picture, etc., and the application will automatically initiate a voice call to a destination. The "Click-to-Dial" service is implemented through an application (app) 414 installed on an end user device 412. End user device 412 may comprise a mobile phone, a computer, a tablet PC, or any other device that is able to execute application 414.

A web service gateway (WSG) 416 is also implemented between internet 410 and IMS network 420. Although web service gateway 416 is illustrated as part of internet 410, those skilled in the art understand that web service gateway 416 is part of a service provider's network that interfaces internet 410 with IMS network 420. Web service gateway 416 may be part of a framework that ties web-based applications to content services, such as the Application Exposure Suite by Alcatel-Lucent.

IMS network 420 includes telecom data element (TDE) 422 that is able to identify telecom information that relates to a web service provided by IMS network 420. IMS network 420 also includes core elements, such as a P/I/S-CSCF, a Home Subscriber Server (HSS), one or more application servers (AS), an Online Charging System (OCS), a Media Gateway (MGW)/Border Gateway (BGW), etc.

Figure 5:
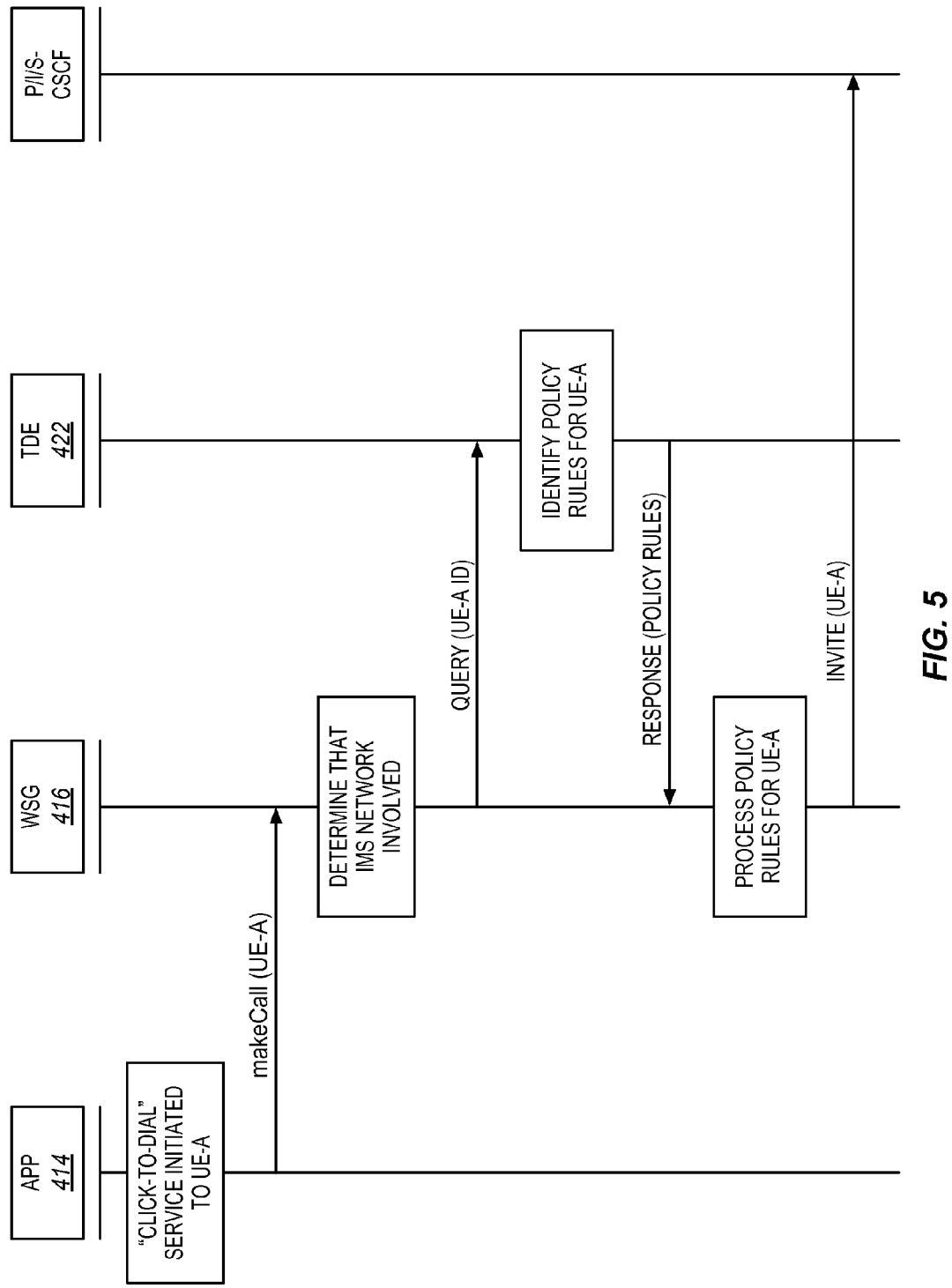
FIG. 5 is a message diagram illustrating a web service in an exemplary embodiment.

FIG. 5 is a message diagram illustrating a web service in an exemplary embodiment. Assume for this example that an end user of device 412 selects application 414 to initiate the "Click-to-Dial" service to call a UE 450 that is served by IMS network 420. When this occurs, application 414 generates a service request according to an open API. The service request in this example is referred to "makeCall(UE-A)". Application 414 then sends the service request to web service gateway 416.

Upon receiving the service request, web service gateway 416 processes the headers of the service request to determine if some or all of the requested web service will be provided by IMS network 420. Since the "Click-to-Dial" service will eventually be routed through IMS network 420 to complete a call to UE 450, web service gateway 416 determines that IMS network 420 will be involved in this requested web service. Instead of simply forwarding the service request to IMS network 420 to place the call to UE 450, web service gateway 416 first requests information from IMS network 420 regarding a call by transmitting a query to telecom data element 422.

Telecom data element 422 receives the query from web service gateway 416, and identifies telecom information relating to the web service that will be provided by IMS network 420. For example, the query from web service gateway 416 may include a Public User ID (PUID) for UE 450. Telecom data element 422 may then query different core elements of IMS network 420 to collect information regarding UE 450. For example, telecom data element 422 may query the HSS to identify a subscriber profile for UE 450. Telecom data element 422 may also query the S-CSCF or the HSS to identify policy rules for UE 450. Telecom data element 422 may also query the OCS to identify charging rules for UE 450. Telecom data element 422 may identify any other desired information regarding a call over IMS network 420 to UE 450.

Assume for this example that telecom data element 422 identifies policy rules (i.e., Policy and Charging Control (PCC) rules) attributable to UE 450. Telecom data element 422 then transmits a response to web service gateway 416 that includes the policy rules. Web service gateway 416 then processes the policy rules to determine how to handle the service request for the "Click-to-Dial" service. For example, web service gateway 416 may process internal rules from a policy engine and the policy rules from IMS network 420 to generate finalized policy rules for the requested web service. Web service gateway 416 will then handle the service request based on the finalized policy rules. Web service gateway 416 also caches the policy rules from IMS network 420 for a time period in order to handle future service requests to the same party.

In this example, assume that the "Click-to-Dial" service is allowed based on the finalized policy rules determined by web service gateway 416. Therefore, web service gateway 416 converts the open API service request to a SIP service request that is used by IMS network 420, which is a SIP INVITE. Web service gateway 416 also inserts the IMS policy rules previously provided by telecom data element 422. Web service gateway 416 then transmits the SIP INVITE to the P/I/S-CSCF to initiate a voice call to UE 450 according to the "Click-to-Dial" service. IMS network 420 will then operate in a conventional manner to connect the call to UE 450.

In the above example, there may be situations where the voice call would not be allowed due to the IMS policy rules provided by telecom data element 422. For example, there may be restrictions defined for calls to UE 450, such as based on time of day, location, etc. If the requested "Click-to-Dial" service violates one or more of these restrictions, then web service gateway 416 rejects the service request from application 414. When a service request is rejected, web service gateway 416 may send a notification to application 414 indicating as such.

Because web service gateway 416 requests policy rules from telecom data element 422 before sending the SIP INVITE to IMS network 420, web service gateway 416 ensures that a voice call initiated from a web service is in-line with other voice calls placed over IMS network 420. IMS network 420 has policy rules for normal voice calls, and an end user of UE 450 expects to experience voice calls in the manner controlled by the policy rules. Web service gateway 416 acquires these policy rules when a web service requests a voice call over IMS network 420. Therefore, web service gateway 416 will be able to handle the web service based on the policies defined in IMS network 420. Because the same policies are enforced regardless of whether a normal voice call is placed over IMS network 420 or a voice call is placed through a web service, the end user will have the same voice call experience.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
    a web service gateway in a packet-switched network having a processor configured to receive service requests for web services from web-based applications that are formatted according to an open Application Programming Interface (API), to convert the service requests into protocols that are used by network elements that provide the web services, and to forward the service requests to the network elements;
    the web service gateway is further configured to receive a service request for a web service from a web-based application;

the web service gateway is further configured to determine that at least a portion of the web service includes a voice service provided by a telecom network, to transmit a query to a telecom data element in the telecom network requesting information from the telecom data element that relates to the voice service as part of the web service, to receive a response from the telecom data element that includes the telecom information that relates to the voice service, and to process the telecom information to determine how to handle the service request for the web service.

2. The system of claim 1 wherein:
the web service gateway is further configured to convert the service request from the open API to a second protocol used in the telecom network, to select a subset of the telecom information to insert in the converted service request, and to transmit the converted service request to the network element of the telecom network that provides the voice service as part of the web service.

3. The system of claim 1 wherein:
the telecom information comprises context information that relates to the voice service. the first protocol comprises an open Application Programming Interface (API).

4. The system of claim 1 wherein:
the telecom information comprises policy rules that relate to the voice service provided by the telecom network as part of the web service.

5. The system of claim 1 wherein:
the telecom information comprises a subscriber profile for at least one party involved in the web service.

6. The system of claim 1 wherein:
an interface between the telecom data element and the web service gateway comprises a Diameter interface.

7. The system of claim 1 wherein:
the open API comprises RESTful.

8. The system of claim 1 wherein:
the open API comprises SOAP.

9. The system of claim 1 wherein:
the open API comprises Parlay X.

10. The system of claim 1 wherein:
the web service gateway is further configured to process the telecom information with a policy engine to generate policy rules for the web service, and to determine whether or not to forward the service request to the network element of the telecom network based on the policy rules.

11. A method operable in a web service gateway of a packet-switched network that receives service requests for web services from web-based applications that are formatted according to an open Application Programming Interface (API), converts the service requests into protocols that are used by network elements that provide the web services, and forwards the service requests to the network elements, the method comprising:

receiving a service request for a web service in the web service gateway from a web-based application;

determining, at the web service gateway, that at least a portion of the web service includes a voice service provided by a telecom network;

transmitting a query from the web service gateway to a telecom data element in the telecom network requesting information from the telecom data element that relates to the voice service as part of the web service;

receiving a response in the web service gateway from the telecom data element that includes the telecom information that relates to the voice service; and processing the telecom information at the web service gateway to determine how to handle the service request for the web service.

12. The method of claim 11 further comprising:
converting, at the web service gateway, the service request from the open API to a second protocol used in the telecom network;

selecting a subset of the telecom information to insert in the converted service request; and transmitting the converted service request from the web service gateway to the network element of the telecom network that provides the voice service as part of the web service.

13. The method of claim 11 wherein:
the telecom information comprises context information that relates to the voice service provided by the telecom network as part of the web service.

14. The method of claim 11 wherein:
the telecom information comprises policy rules that relate to the voice service provided by the telecom network as part of the web service.

15. The method of claim 11 wherein:
the telecom information comprises a subscriber profile for at least one party involved in the web service.

16. The method of claim 11 wherein:
an interface between the telecom data element and the web service gateway comprises a Diameter interface.

17. The method of claim 11 wherein:
the open API comprises RESTful.

18. The method of claim 11 wherein:
the open API comprises SOAP.

19. The method of claim 11 wherein:
the open API comprises Parlay X.

20. The method of claim 11 further comprising:
processing the telecom information with a policy engine at the web service gateway to generate policy rules for the web service; and determining whether or not to forward the service request to the network element of the telecom network based on the policy rules.

* * * * *